(12) United States Patent
Bloom et al.

(10) Patent No.: US 9,976,746 B2
(45) Date of Patent: May 22, 2018

(54) COMBUSTOR ASSEMBLY FOR A TURBINE ENGINE

(71) Applicant: General Electric Company, Schenectady, NY (US)

(72) Inventors: Nicholas John Bloom, Maineville, OH (US); Daniel Kirtley, Blue Ash, OH (US); Adam Robert Kahn, Mason, OH (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 14/842,872

(22) Filed: Sep. 2, 2015

(65) Prior Publication Data

US 2017/0059167 A1    Mar. 2, 2017

(51) Int. Cl.
| | |
|---|---|
| *F23R 3/60* | (2006.01) |
| *F23R 3/00* | (2006.01) |
| *F02C 3/04* | (2006.01) |
| *F23R 3/10* | (2006.01) |

(52) U.S. Cl.
CPC .............. *F23R 3/60* (2013.01); *F02C 3/04* (2013.01); *F23R 3/002* (2013.01); *F23R 3/007* (2013.01); *F23R 3/10* (2013.01); *F05D 2220/32* (2013.01); *F05D 2240/90* (2013.01);
(Continued)

(58) Field of Classification Search
CPC .... F23R 3/60; F23R 3/50; F23R 3/007; F23R 2900/00017; F23R 3/002; F02C 3/04; F02C 7/20; F05D 2260/941; F05D 2220/32; F05D 2240/90; F23M 2900/05002; F01D 25/162
See application file for complete search history.

(56) References Cited

U.S. PATENT DOCUMENTS

| | | | |
|---|---|---|---|
| 3,604,716 A | 9/1971 | Webert | |
| 4,363,208 A * | 12/1982 | Hoffman | ................ F23R 3/60 431/352 |

(Continued)

FOREIGN PATENT DOCUMENTS

| | | |
|---|---|---|
| DE | 102013220482 B3 | 4/2015 |
| EP | 1152191 A2 | 11/2001 |

(Continued)

OTHER PUBLICATIONS

EP Search Report dated on Jan. 26, 2017 issued in connection with related Application No. 16185942.6.
(Continued)

*Primary Examiner* — Rene Ford
(74) *Attorney, Agent, or Firm* — General Electric Company; William Scott Andes

(57) ABSTRACT

A combustor assembly for a gas turbine engine is provided. The combustor assembly generally includes an annular dome and a liner. The liner at least partially defines a combustion chamber and includes the forward end received within a slot defined by the annular dome. Additionally, a heat shield is provided. The heat shield includes an end also received within the slot defined by the annular dome. A mounting assembly attaches the forward end of the liner and the end of the heat shield to the annular dome, such that the forward end of the liner and the end of the heat shield are co-mounted within the slot defined by the annular dome.

14 Claims, 4 Drawing Sheets

(52) U.S. Cl.
CPC ............... *F05D 2260/941* (2013.01); *F23M 2900/05002* (2013.01); *F23R 2900/00017* (2013.01)

(56) References Cited

U.S. PATENT DOCUMENTS

| | | | |
|---|---|---|---|
| 5,180,282 A * | 1/1993 | Lenhart | F01D 25/162 403/287 |
| 5,291,732 A | 3/1994 | Halila | |
| 5,291,733 A * | 3/1994 | Halila | F23R 3/60 60/752 |
| 5,330,321 A | 7/1994 | Roberts et al. | |
| 5,680,767 A | 10/1997 | Lee et al. | |
| 5,996,335 A | 12/1999 | Ebel | |
| 6,234,755 B1 | 5/2001 | Bunker et al. | |
| 6,383,602 B1 | 5/2002 | Fric et al. | |
| 6,401,447 B1 | 6/2002 | Rice et al. | |
| 6,435,514 B1 | 8/2002 | Aksit et al. | |
| 6,775,985 B2 * | 8/2004 | Mitchell | F23R 3/007 60/772 |
| 6,840,519 B2 | 1/2005 | Dinc et al. | |
| 6,904,757 B2 | 6/2005 | Mitchell et al. | |
| 7,237,389 B2 | 7/2007 | Ryan et al. | |
| 7,328,580 B2 | 2/2008 | Lee et al. | |
| 7,572,099 B2 | 8/2009 | Addis | |
| 7,617,688 B2 * | 11/2009 | Biebel | F23R 3/002 60/752 |
| 7,849,696 B2 | 12/2010 | De Sousa et al. | |
| 7,997,867 B1 | 8/2011 | Shih et al. | |
| 8,057,179 B1 | 11/2011 | Liang | |
| 8,057,181 B1 | 11/2011 | Liang | |
| 8,141,370 B2 | 3/2012 | Bulman et al. | |
| 8,141,371 B1 | 3/2012 | Habarou et al. | |
| 8,556,531 B1 | 10/2013 | Bird et al. | |
| 8,572,981 B2 | 11/2013 | Bunker | |
| 8,607,577 B2 | 12/2013 | Ruberte et al. | |
| 8,689,586 B2 | 4/2014 | Hirayama et al. | |
| 8,739,547 B2 | 6/2014 | Jarmon et al. | |
| 8,756,935 B2 | 6/2014 | Duval et al. | |
| 8,834,056 B2 | 9/2014 | Keith et al. | |
| 8,863,527 B2 | 10/2014 | Holcomb et al. | |
| 9,097,211 B2 | 8/2015 | Martinez et al. | |
| 9,127,565 B2 | 9/2015 | Keller et al. | |
| 9,423,129 B2 | 8/2016 | Graves et al. | |
| 2002/0184886 A1 | 12/2002 | Calvez et al. | |
| 2004/0118122 A1 | 6/2004 | Mitchell et al. | |
| 2004/0134198 A1 * | 7/2004 | Mitchell | F23R 3/007 60/796 |
| 2005/0016178 A1 * | 1/2005 | Wasif | F23R 3/14 60/752 |
| 2005/0135931 A1 | 6/2005 | Nakamata et al. | |
| 2007/0128002 A1 * | 6/2007 | Geary | F01D 11/005 411/511 |
| 2008/0286090 A1 | 11/2008 | Okita | |
| 2011/0097191 A1 | 4/2011 | Woo et al. | |
| 2011/0271684 A1 | 11/2011 | Corsmeier et al. | |
| 2011/0293423 A1 | 12/2011 | Bunker et al. | |
| 2011/0305583 A1 | 12/2011 | Lee et al. | |
| 2013/0175015 A1 | 7/2013 | Tanaka et al. | |
| 2013/0205787 A1 | 8/2013 | Zelesky et al. | |
| 2013/0205791 A1 | 8/2013 | Mongillo et al. | |
| 2013/0205792 A1 | 8/2013 | Gleiner et al. | |
| 2013/0209229 A1 | 8/2013 | Xu et al. | |
| 2013/0209236 A1 | 8/2013 | Xu | |
| 2013/0209269 A1 | 8/2013 | Gleiner et al. | |
| 2015/0016971 A1 | 1/2015 | Freeman | |
| 2015/0330633 A1 | 11/2015 | Graves et al. | |
| 2016/0047549 A1 | 2/2016 | Landwehr et al. | |
| 2016/0215980 A1 | 7/2016 | Chang | |
| 2016/0215981 A1 | 7/2016 | Dery | |
| 2016/0265389 A1 | 9/2016 | Jarmon | |

FOREIGN PATENT DOCUMENTS

| | | |
|---|---|---|
| EP | 1265031 A1 | 12/2002 |
| EP | 1719949 A2 | 11/2006 |
| EP | 1741981 A1 | 1/2007 |
| EP | 1777461 A2 | 4/2007 |
| EP | 2366678 A2 | 9/2011 |
| FR | 3004518 A1 | 10/2014 |
| FR | 3022480 A1 | 12/2015 |
| WO | 2013188645 A2 | 12/2013 |
| WO | 2015038274 A2 | 3/2015 |

OTHER PUBLICATIONS

EP Search Report & WO dated on Feb. 1, 2017 issued in connection with related Application No. 16185947.5.

GE Related Case Form.

European Search Report and Opinion issued in connection with corresponding EP Application No. 16185939.2 dated Jan. 30, 2017.

U.S. Appl. No. 14/842,867, filed Sep. 2, 2015, Nicholas John Bloom.

U.S. Appl. No. 14/842,883, filed Sep. 2, 2015, Nicholas John Bloom.

* cited by examiner

COMBUSTOR ASSEMBLY FOR A TURBINE ENGINE

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, given an ability for CMC materials to withstand relatively extreme temperatures, there is particular interest in replacing components within the combustion section of the gas turbine engine with CMC materials. More particularly, one or more heat shields of gas turbine engines are more commonly being formed of CMC materials.

However, certain gas turbine engines have had problems accommodating certain mechanical properties of the CMC materials incorporated therein. For example, CMC materials have different coefficients of thermal expansion than the traditional metal materials. Therefore, the one or more heat shields may not be attached directly to, e.g., a metallic annular dome positioned within the combustion section of the gas turbine engine, as the metallic annular dome and the CMC heatshield expand relative to one another during operation of the gas turbine engine.

Accordingly, a combustor assembly capable of attaching a CMC heatshield to a metallic annular dome would be useful. More particularly, a combustor assembly capable of attaching a CMC heatshield and other CMC components of the combustion section to a metallic annular dome would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a combustor assembly for a gas turbine engine defining an axial direction is provided. The combustor assembly includes an annular dome including an enclosed surface defining a slot. The combustor assembly also includes a liner at least partially defining a combustion chamber and extending between an aft end and a forward end generally along the axial direction. The forward end of the liner is received within the slot of the annular dome. The combustor assembly also includes a heat shield including an end also received within the slot of the annular dome and a mounting assembly positioned at least partially within the slot of the annular dome. The mounting assembly attaches the forward end of the liner and the end of the heat shield to the annular dome.

In another exemplary embodiment of the present disclosure, a gas turbine engine defining an axial direction is provided. The gas turbine engine includes a compressor section, a turbine section mechanically coupled to the compressor section through a shaft, and a combustor assembly disposed between the compressor section and the turbine section. The combustor assembly includes an annular dome including an enclosed surface defining a slot and a liner at least partially defining a combustion chamber and extending between an aft end and a forward end generally along the axial direction. The forward end of the liner is received within the slot of the annular dome. The combustor assembly also includes a heat shield including an end also received within the slot of the annular dome, and a mounting assembly positioned at least partially within the slot of the annular dome. The mounting assembly attaches the forward end of the liner and the end of the heat shield to the annular dome.

In still another exemplary embodiment of the present disclosure, a combustor assembly for a gas turbine engine defining an axial direction is provided. The combustor assembly includes an outer annular dome including an enclosed surface defining n slot and an outer liner including a forward end received within the slot of the outer annular dome. The combustor assembly also includes an inner annular dome also including an enclosed surface defining a slot and an inner liner including a forward end received within the slot of the outer annular dome. The inner and outer liners at least partially define a combustion chamber. The combustor assembly also includes a heat shield including a first end and a second end. The first end is co-mounted with the outer liner to the outer annular dome within the slot of the outer annular dome. The second end is co-mounted with the inner liner to the inner annular dome within the slot of the inner annular dome.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
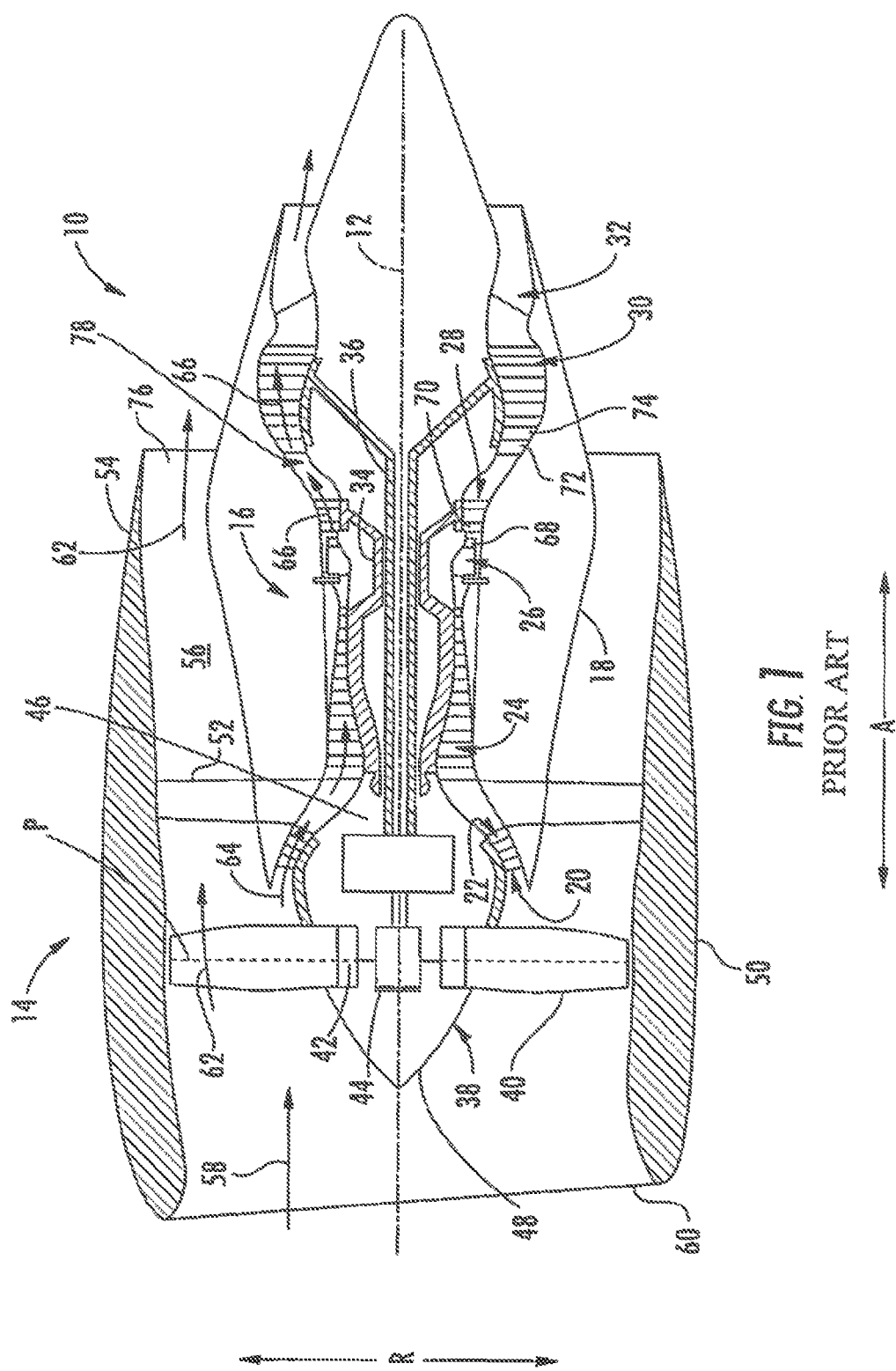
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 2:
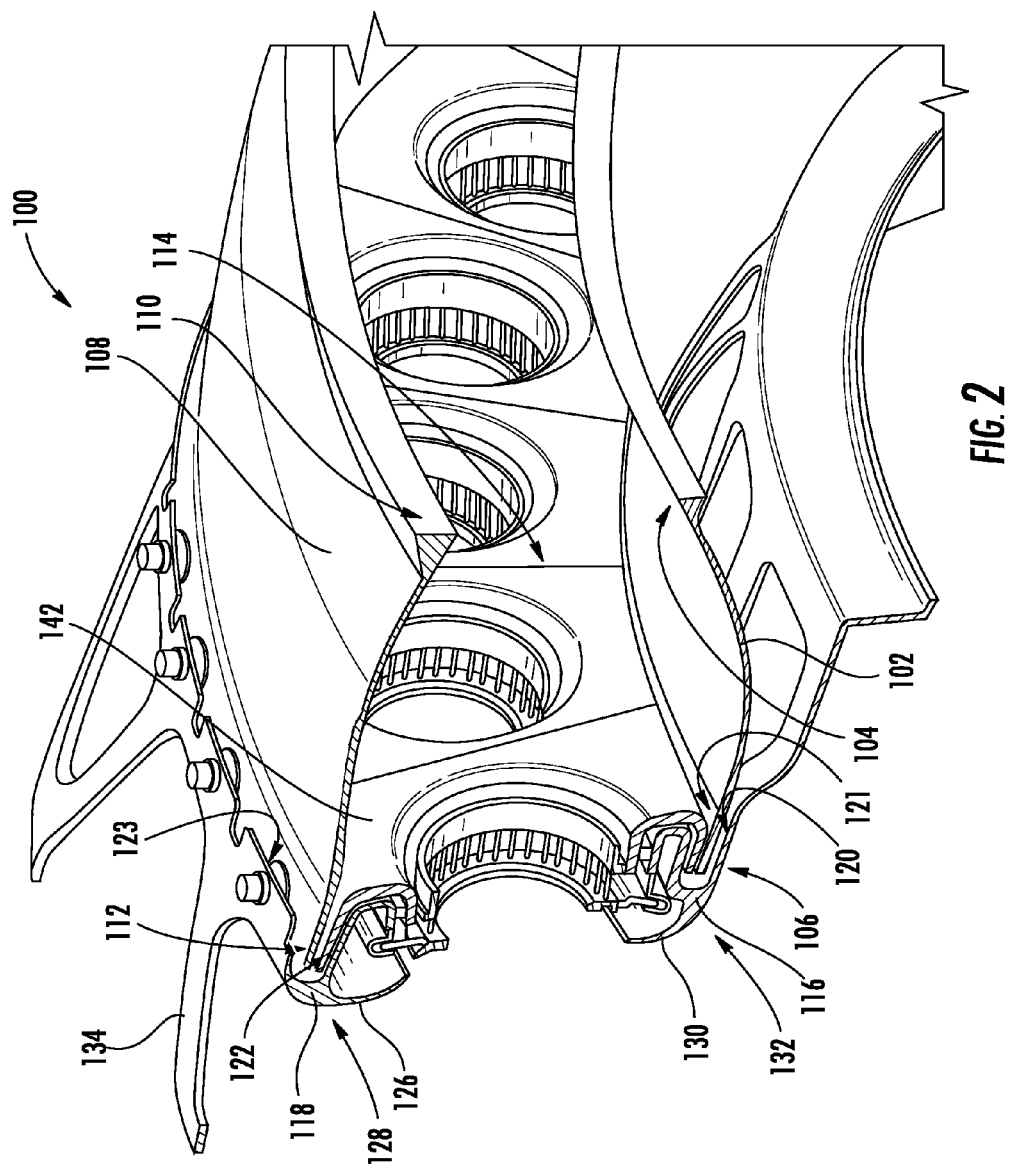
FIG. 2 is a perspective, cross-sectional view of a combustor assembly in accordance with an exemplary embodiment of the present disclosure.
Figure 3:
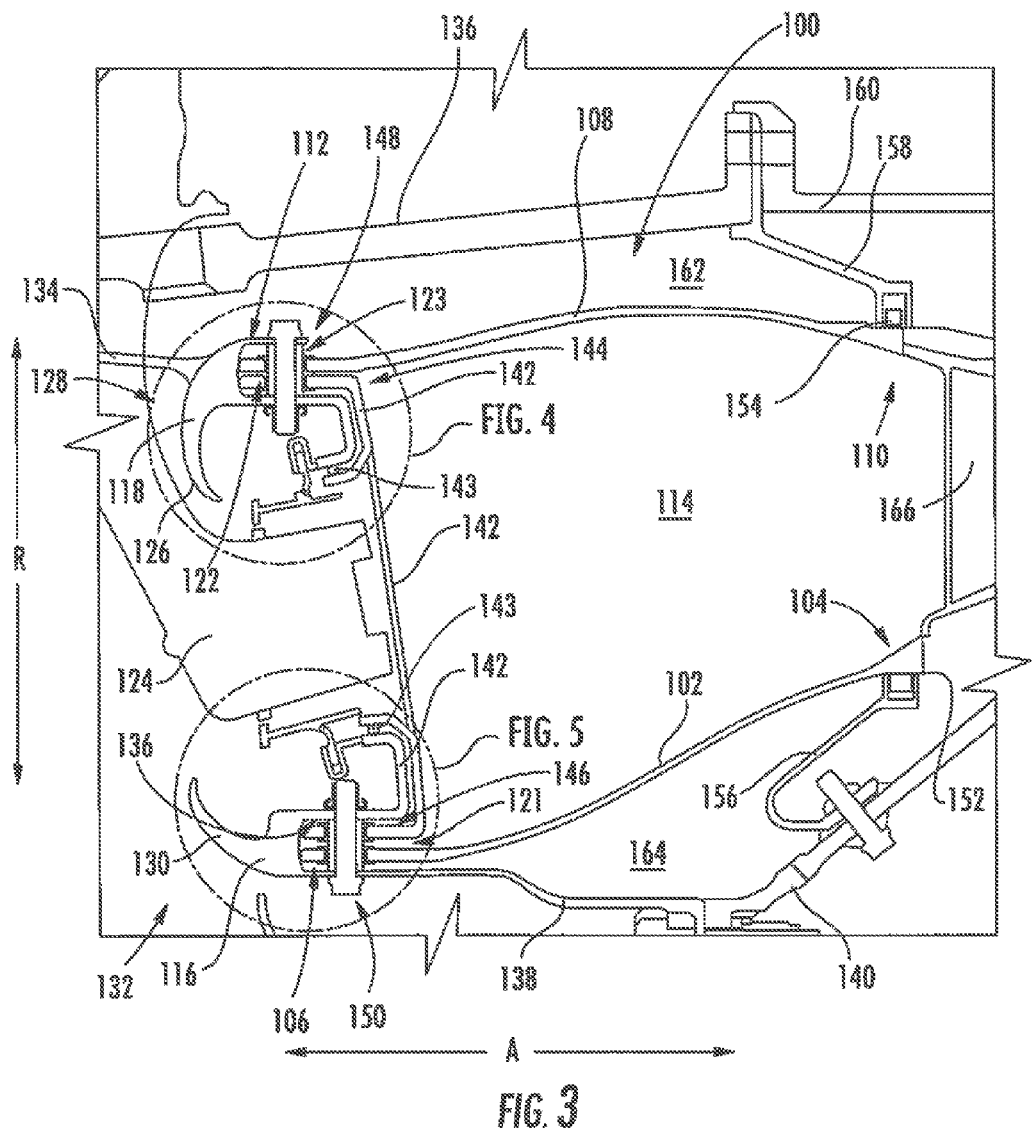
FIG. 3 is a schematic, cross-sectional view of the exemplary combustor assembly of FIG. 2.

Referring now to FIGS. 2 and 3, close-up cross-sectional views are provided of a combustor assembly 100 in accordance with an exemplary embodiment of the present disclosure. For example, the combustor assembly 100 of FIGS. 2 and 3 may be positioned in the combustion section 26 of the exemplary turbofan engine 10 of FIG. 1. More particularly, FIG. 2 provides a perspective, cross-sectional view of the combustor assembly 100 and FIG. 3 provides a side, schematic, cross-sectional view of the exemplary combustor assembly 100 of FIG. 2. Notably, the perspective, cross-sectional view of the combustor assembly 100 in FIG. 2 depicts an outer combustor casing 136 and other components removed for clarity.

As shown, the combustor assembly 100 generally includes an inner liner 102 extending between and aft end 104 and a forward end 106 generally along the axial direction A, as well as an outer liner 108 also extending between and aft end 110 and a forward end 112 generally along the axial direction A. The inner and outer liners 102, 108 together at least partially define a combustion chamber 114 therebetween. The inner and outer liners 102, 108 are each attached to an annular dome. More particularly, the combustor assembly 100 includes an inner dome 116 attached to the forward end 106 of the inner liner 102 and an outer dome 118 attached to the forward end 112 of the outer liner 108. As will be discussed in greater detail below, the inner dome 116 includes an enclosed surface 120 defining a slot 121 for receipt of the forward end 106 of the inner liner 102, and the outer dome 118 includes an enclosed surface 122 defining a slot 123 for receipt of the forward end 112 of the outer liner 108.

The combustor assembly 100 further includes a plurality of fuel air mixers 124 (FIG. 3) spaced along a circumferential direction within the outer dome 118. Additionally, the plurality of fuel air mixers 124 are disposed between the outer dome 118 and the inner dome 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer domes 116, 118 are configured to assist in providing such a flow of compressed air from the compressor section into or through the fuel air mixers 124. For example, the outer dome 118 includes an outer cowl 126 at a forward end 128 and the inner dome 116 similarly includes an inner cowl 130 at a forward end 132. The outer cowl 126 and inner cowl 130 may assist in directing the flow of compressed air from the compressor section 26 into or through one or more of the fuel air mixers 124.

Moreover, the inner and outer domes 116, 118 each include attachment portions configured to assist in mounting the combustor assembly 100 within the turbofan engine 10. For example, the outer dome 118 includes an attachment extension 134 configured to be mounted to an outer combustor casing 136 (FIG. 3) and the inner dome 116 includes a similar attachment extension 138 configured to attach to an annular support member 140 (FIG. 3) within the turbofan engine 10. In certain exemplary embodiments, the inner dome 116 may be formed integrally as a single annular component, and similarly, the outer dome 118 may also be formed integrally as a single annular component. It should be appreciated, however, that in other exemplary embodiments, the inner dome 116 and/or the outer dome 118 may alternatively be formed by one or more components joined in any suitable manner. For example, with reference to the outer dome 118, in certain exemplary embodiments, the outer cowl 126 may be formed separately from the outer dome 118 and attached to the forward end 128 of the outer dome 118 using, e.g., a welding process. Similarly, the attachment extension 134 may also be formed separately from the outer dome 118 and attached to the forward end 128 of the outer dome 118 using, e.g., a welding process. Additionally, or alternatively, the inner dome 116 may have a similar configuration.

Referring still to FIGS. 2 and 3, the exemplary combustor assembly 100 further includes a plurality of heat shields 142, each positioned around a fuel air mixer 124 and arranged circumferentially (see FIG. 2). The heat shields 142, for the embodiment depicted, are attached to and extend between the outer dome 118 and the inner dome 116. Additionally, a seal 143 is provided between the heat shield 142 and the inner and outer domes 116, 118 extending around the fuel air mixer 124 to provide sealing between the heat shield 142 and the inner and outer domes 116, 118 and/or to provide dampening between the heat shield 142 and the inner and outer domes 116, 118. Moreover, each heat shield 142 extends generally between a first end 144, or radially outer end, and a second end 146, or radially inner end. The first end 144 is received within the slot 123 of the outer annular dome 118 and the second end 146 is received within the slot 121 of the inner annular dome 116. More particularly, as will be discussed in greater detail below with reference to FIGS. 4 and 5, the first end 144 of each heat shield 142 is co-mounted with the forward end 112 of the outer liner 108 to the outer annular dome 118 within the slot 123 of the outer annular dome 118, and the second end 146 of each heat shield 142 is co-mounted with the forward end 106 of the inner liner 102 to the inner annular dome 116 within the slot 121 of the inner annular dome 116. The heat shields 142 are configured to protect certain components of the turbofan engine 10 from the relatively extreme temperatures of the combustion chamber 114.

For the embodiment depicted, the inner liner 102, the outer liner 108, and the heat shields 142 are each formed of a ceramic matrix composite (CMC) material, which is a non-metallic material having high temperature capability and low ductility. Exemplary CMC materials utilized for such liners 102, 108 and heat shields 142 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3\times10^{-6}$ in/in/° F. to about $3.5\times10^{-6}$ in/in/° F. in a temperature of approximately 1000-1200° F.

By contrast, the inner dome 116 and outer dome 118 may be formed of a metal, such as a nickel-based superalloy (having a coefficient of thermal expansion of about $8.3$-$8.5\times10^{-6}$ in/in/° F. in a temperature of approximately 1000-1200° F.) or cobalt-based superalloy (having a coefficient of thermal expansion of about $7.8$-$8.1\times10^{-6}$ in/in/° F. in a temperature of approximately 1000-1200° F.). Thus, the inner and outer liners 102, 108 and heat shields 142 may be better able to handle the extreme temperature environment presented in the combustion chamber 114. However, attaching the outer liner 108 and first end 144 of each heat shield 142 to the outer annular dome 118 presents a problem due to the differing mechanical characteristics of the components. Accordingly, as will be discussed below, a plurality of specially designed outer mounting assemblies 148 are utilized to attach the forward end 112 of the outer liner 108 and first end 144 of each heat shield 142 to the outer annular dome 118. Additionally, attaching the inner liner 102 and the second end 146 of each heat shield 142 to the inner annular dome 116 presents a similar problem due to the differing mechanical characteristics of the components. Accordingly, as will also be discussed below, a plurality of specially designed inner mounting assemblies 150 are utilized to attach the forward end 106 of the inner liner 102 and second end 146 of each heat shield 142 to the inner annular dome 116. The outer and inner mounting assemblies 148, 150 are configured to accommodate the relative thermal expansion between the inner and outer domes 116, 118, heat shields 142, and the inner and outer liners 102, 108 along the radial direction R.

Referring particularly to FIG. 3, at the aft end 104 of the inner liner 102 and at the aft end 110 of the outer liner 108, the combustor assembly 100 includes an inner piston ring 152 and an outer piston ring 154, respectively. The inner piston ring 152 is attached to an inner piston ring holder 156 extending from and attached to an interior casing (which for the embodiment depicted is the annular support member 140). Similarly, the outer piston ring 154 is attached to an outer piston ring holder 158 extending from and attached to an outer casing (which for the embodiment depicted includes the outer combustor casing 136 and an outer turbine casing 160). The inner piston ring holder 156 and the outer piston ring holder 158 are configured to accommodate an expansion of the inner liner 102 and the outer liner 108 generally along the axial direction A, as well as generally along the radial direction R.

As will be discussed in greater detail below, the above configuration may allow for the relative thermal expansions of the heat shields 142 and the inner and outer liners 102, 108, each formed of a CMC material, and the inner and outer domes 116, 118, each formed of a metal material. Moreover, in such a configuration can also control an airflow of relatively high pressure compressed air from the compressor section 26 into the relatively low pressure combustion chamber 114. For example, such a configuration may control an airflow of relatively high pressure compressed air in a high pressure plenum 162 defined between the outer liner 108 and the outer combustor casing 136 into the relatively low pressure combustion chamber 114, as well as an airflow of relatively high pressure compressed air in an inner passage 164 positioned radially inward from the inner liner 102 into the relatively low pressure combustion chamber 114.

Referring still to FIG. 3, and as is discussed above, the combustion gases 66 flow from the combustion chamber 114 into and through the turbine section of the turbofan engine 10 where a portion of thermal and/or kinetic energy from the combustion gases 66 is extracted via sequential stages of turbine stator vanes and turbine rotor blades. A stage 1 turbine blade 166 is depicted schematically in FIG. 3, aft of the combustor assembly 100.

Figure 4:
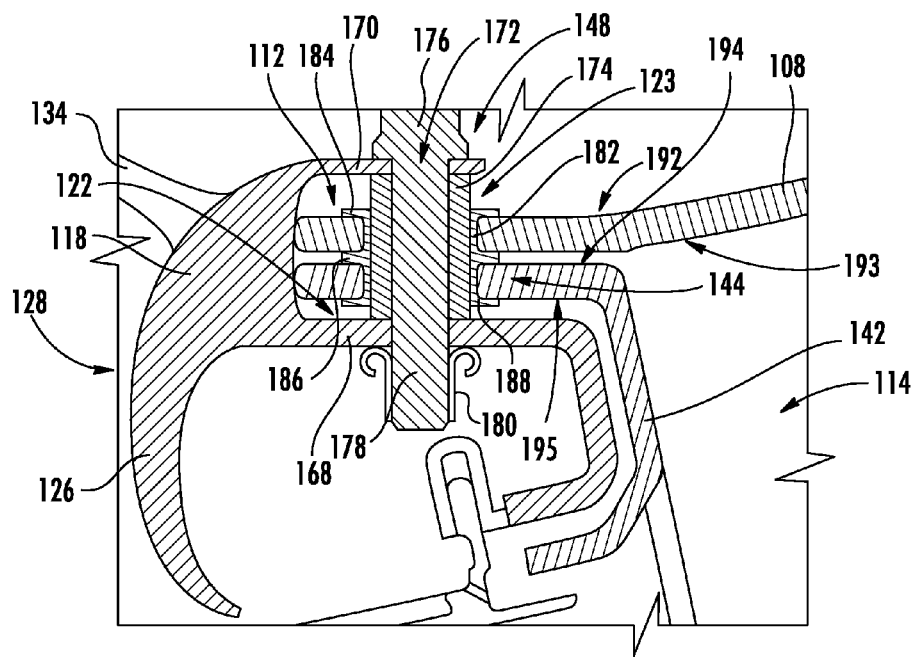
FIG. 4 is a close up, cross-sectional view of an attachment point of the exemplary combustor assembly of FIG. 2, where a forward end of an outer liner and a first end of a heat shield are attached to an outer annular dome.

Referring now to FIG. 4, a close up, cross-sectional view is depicted of an attachment point where the first end 144 of one of the heat shields 142 is co-mounted with the forward end 112 of the outer liner 108. The first end 144 of the heat shield 142 and forward end 112 of the outer liner 108 are co-mounted to the outer annular dome 118 within the slot 123 of the outer annular dome 118.

As stated, to allow for a relative thermal expansion between the outer liner 108, the heat shield 142, and the outer dome 118, the outer mounting assemblies 148 are provided positioned at least partially within the slot 123 of the outer annular dome 118. The outer mounting assemblies 148 attach the forward end 112 of the outer liner 108 and the first end 144 of the heat shield 142 to the outer annular dome 118. More particularly, the outer dome 118 includes a base plate 168 and a yoke 170. The base plate 168 and the yoke 170 each extend substantially parallel to one another, which for the embodiment depicted is a direction substantially parallel to the axial direction A of the turbofan engine 10 (see also FIG. 3). Notably, the enclosed surface 122 of the outer annular dome 118 includes a surface of the base plate 168 and a surface of the yoke 170, such that the slot 123 is defined between the base plate 168 and the yoke 170. Further, in certain exemplary embodiments, the yoke 170 may extend circumferentially with the outer dome 118, tracking the base plate 168. With such a configuration, the slot 123 may be considered an annular slot. However, in other embodiments, the yoke 170 may include a plurality of circumferentially spaced tabs (see FIG. 2), each of the individual tabs of the yoke 170 defining individual segmented portions of the slot 123 with the base plate 168.

Additionally, the exemplary outer mounting assembly 148 depicted extends through the yoke 170 of the outer dome 118, the forward end 112 of the outer liner 108 (positioned in the slot 123), the first end 144 of the heat shield 142 (also positioned in the slot 123), and the base plate 168 of the outer dome 118. More particularly, for the embodiment depicted, the outer mounting assembly 148 includes a pin 172 and a bushing 174. The pin 172 includes a head 176 and a body 178, the body 178 extending through the yoke 170, the forward end 112 of the outer liner 108 (positioned in the slot 123), the first end 144 of the heat shield 142 (also positioned in the slot 123), and the base plate 168. A nut 180 is attached to a distal end of the body 178 of the pin 172. In certain exemplary embodiments, the pin 172 may be configured as a bolt and the nut 180 may be rotatably engaged with the pin 172 for tightening the mounting assembly 148. Alternatively, however, in other exemplary embodiments the pin 172 and nut 180 may have any other suitable configuration. For example, in other exemplary embodiments, the pin 172 may include a body 178 defining a substantially smooth cylindrical shape and the nut 180 may be configured as a clip.

Additionally, the bushing 174 is generally cylindrical in shape and positioned around the body 178 of the pin 172 within the slot 123. For the embodiment depicted, the bushing 174 is pressed between the yolk 170 and the base plate 168 by tightening the nut 180 on the pin 172. Moreover, for the embodiment depicted, the outer mounting assembly 148 includes a single metal grommet 182 positioned around the bushing 174 and pin 172. The grommet 182 is positioned in an opening in the forward end 112 of the outer liner 108 and in an opening in the first end 144 of the heat shield 142. The grommet 182 includes an outer collar 184 positioned adjacent to an outside surface 192 of the outer liner 108, a middle collar 186 positioned adjacent to an inside surface 193 of the outer liner 108 and an outside surface 194 of the heat shield 142, and an inner collar 188 positioned adjacent to an inside surface 195 of the heat shield 142. As the grommet 182 depicted is configured as a single grommet, the first end 144 of the heat shield 142 is fixed relative to the forward end 112 of the outer liner 108. Additionally, the metal grommet 182 may reduce an amount of wear on the forward end 112 of the outer liner 108 and the first end 144 of the heat shield 142 as the outer liner 108 and heat shield 142 move inwardly and outwardly generally along the radial direction R relative to the outer dome 118.

Referring still to FIG. 4, the forward end 112 of the outer liner 108 is positioned adjacent to the enclosed surface 122 of the outer dome 118 within the slot 123. Similarly, the first end 144 of the heat shield 142 is positioned adjacent to the enclosed surface 122 of the outer dome 118 within the slot 123. Such a configuration may allow for the exemplary combustor assembly 100 depicted to control an airflow through the attachment point between the outer annular dome 118, the outer liner 108, and the heat shield 142 as the outer annular dome 118 thermally expands relative to the outer liner 108 and the heat shield 142 along the radial direction R.

It should be appreciated, however, that in other exemplary embodiments, any other suitable cap may be provided at the forward end 112 of the outer liner 108 and the first end 144 of the heat shield 142. Alternatively, however, in other exemplary embodiments, no cap may be provided at the forward end 112 of the outer liner 108 and the first end 144 of the heat shield 142.

Figure 5:
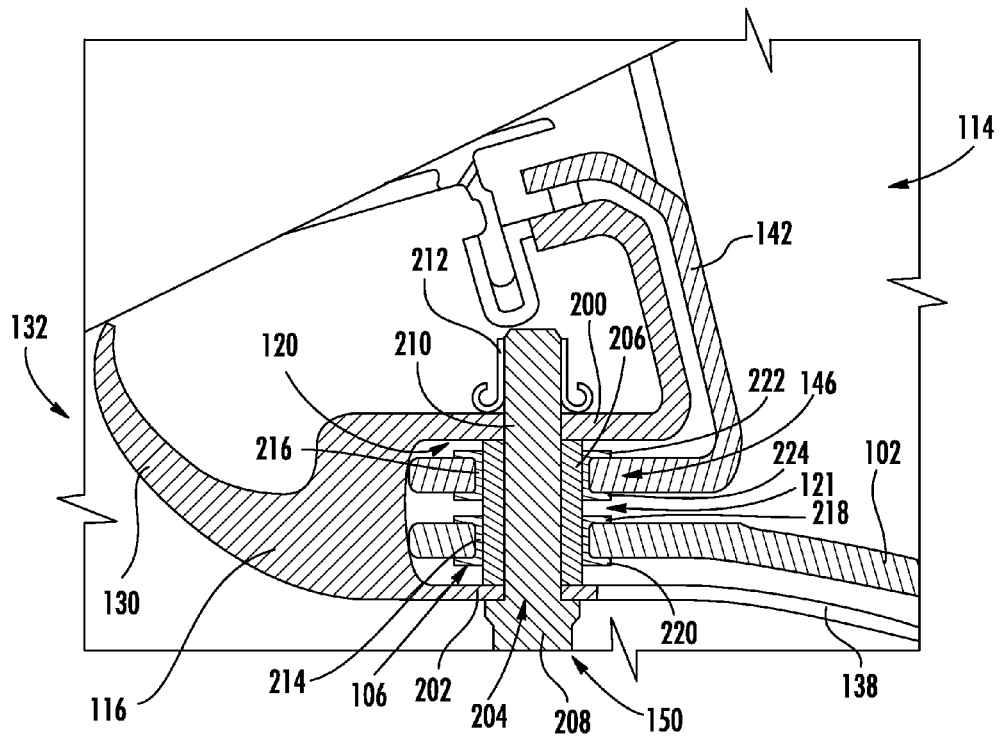
FIG. 5 is a close-up, cross-sectional view of another attachment point of the exemplary combustor assembly of FIG. 2, where a forward end of an inner liner and a second end of the heat shield are attached to an inner annular dome.

Referring now to FIG. 5, a close-up, cross-sectional view is depicted of an attachment point where the second end 146 of the heat shield 142 is co-mounted with the forward end 106 of the inner liner 102. The second end 146 of the heat shield 142 and the forward end 106 of the inner liner 102 are co-mounted to the inner annular dome 116 within the slot 121 of the inner annular dome 116.

Similar to the attachment point depicted in FIG. 4 and discussed above, the attachment point in FIG. 5 includes the inner mounting assembly 150 positioned at least partially within the slot 121 of the inner annular dome 116. The inner mounting assembly 150 is configured to allow for a relative thermal expansion of the inner liner 102, the heat shield 142, and the inner annular dome 116. Additionally, the inner mounting assembly 150 attaches the forward end 106 of the inner liner 102 and the second end 146 of the heat shield 142 to the inner annular dome 116. More particularly, similar to the outer dome 118, the inner dome 116 includes a base plate 200 and a yoke 202, each extending substantially parallel to one another, which for the embodiment depicted is substantially parallel to the axial direction A (see also FIG. 3). Additionally, the enclosed surface 120 of the inner annular dome 116 includes a surface of the base plate 200 and a surface of the yoke 202, such that the slot 123 is defined between the base plate 200 and the yoke 202. Similar to the discussion above, in certain exemplary embodiments, the yoke 202 may extend circumferentially with the inner dome 116, tracking the base plate 200. With such a configuration, the slot 121 may be considered an annular slot. However, in other embodiments, the yoke 202 may include a plurality of circumferentially spaced tabs, each of the individual tabs of the yoke 202 defining individual segmented portions of the slot 121 with the base plate 200.

The exemplary inner mounting assembly 150 extends through the yoke 202 of the inner dome 116, the forward end 106 of the inner liner 102, the second end 146 of the heat shield 142, and the base plate 200 of the inner dome 116. More particularly, the inner mounting assembly 150 includes a pin 204 and a bushing 206. The pin 204 includes a head 208 and a body 210, the body 210 extending through the yoke 202, the forward end 106 of the inner liner 102, the second end 146 of the heat shield 142, and the base plate 200. A nut 212 is attached to a distal end of the body 210 of the pin 204. The nut 212 and pin 204 of the inner mounting assembly 150 may be configured in substantially the same manner as the nut 212 and pin 204 of the outer mounting assembly 148 described above with reference to FIG. 4.

Additionally, the bushing 206 is generally cylindrical in shape and is positioned around the body 210 of the pin 204 within the slot 123 of the inner dome 116. For the embodiment depicted, the bushing 206 is pressed between the yolk 202 and the base plate 200 of the inner dome 116 by tightening the nut 212 on the pin 204. Moreover, for the embodiment depicted, the inner mounting assembly 150 also includes a first grommet 214 and a separate second grommet 216, each positioned around the bushing 206 and pin 204. The first grommet 214 is positioned in an opening in the forward end 106 of the inner liner 102 and the second grommet 216 is positioned in an opening in the second end 146 of the heat shield 142. For example, the first grommet 214 includes an inner collar 218 positioned adjacent to an inner surface of the inner liner 102 and an outer collar 220 positioned adjacent to an outer surface of the inner liner 102. Similarly, the second grommet 216 includes an inner collar 222 positioned adjacent to an inner surface of the heat shield 142 and an outer collar 224 positioned adjacent to an outer surface of the heat shield 142. The first and second grommets 214, 216 may reduce an amount of wear on the forward end 106 of the inner liner 102 and the second end 146 of the heat shield 142 as the inner liner 102 and heat shield 142 move inwardly and outwardly generally along the radial direction R relative to the inner dome 116. Additionally, the first and second grommets 214, 216 may move relative to one another generally along the radial direction R along the bushing 206. Thus, such a configuration may allow for the heat shield 142 to thermally expand generally along the radial direction R relative to the inner and/or outer liners 102, 108. More particularly, inclusion of a first grommet 214 and a separate second grommet 216 in the inner mounting assemblies 150 allows for the second end 146 of the heat shield 142 to move along the radial direction R relative to the forward end 106 of the inner liner 102.

It should be appreciated, however, that in other exemplary embodiments, any other suitable configuration may be provided. For example, in other exemplary embodiments, one or more of the outer mounting assemblies 148 may additionally, or alternatively, include a first grommet positioned in an opening in the forward end 112 of the outer liner 108 and a separate second grommet positioned in an opening in the first end 144 of the heat shield 142. In such an exemplary embodiment, one or more of the inner mounting assemblies 150 may instead include a single grommet positioned in an opening in the forward end 106 of the inner liner 102 and in an opening in the second end 146 of the heat shield 142.

Moreover, a forward end 106 of the inner liner 102 is positioned adjacent to the enclosed surface 120 of the inner dome 116 within the slot 121. Similarly, a second end 146 of the heat shield 142 is positioned adjacent to the enclosed surface 120 of the inner dome 116 within the slot 121.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine defining an axial direction, the combustor assembly comprising:
   an annular dome including an enclosed surface defining a slot, an inner dome and an outer dome;
   a liner at least partially defining a combustion chamber and extending between an aft end and a forward end generally along the axial direction, the forward end of the liner received within the slot of the annular dome;
   a heat shield including a first end and a second end, at least one of the first end and the second end also received within the slot of the annular dome; and
   a mounting assembly positioned at least partially within the slot of the annular dome, attaching the forward end of the liner and the end of the heat shield to the annular dome, wherein said heat shield extends from said inner dome to said outer dome,
   wherein the mounting assembly includes a pin, a first grommet, and a second grommet, wherein the first grommet is positioned in an opening in the forward end of the liner, wherein the second grommet is positioned in an opening in the heat shield, and
wherein the first and second grommets are positioned around the pin.

2. The combustor assembly of claim 1, wherein the annular dome includes a base plate and a yoke, wherein the base plate and the yoke extend substantially parallel to one another, and wherein the enclosed surface of the dome includes a surface of the base plate and a surface of the yoke such that the slot is defined between the base plate and the yoke.

3. The combustor assembly of claim 2, wherein the mounting assembly extends through the yoke of the annular dome, the forward end of the liner, at least one of the first end and the second end of the heat shield, and the base plate of the annular dome.

4. The combustor assembly of claim 3, wherein the mounting assembly includes a bushing, wherein the pin extends through the yoke, the forward end of the liner, the heat shield, and the base plate, and wherein the bushing is positioned around the pin within the slot and pressed between the yoke and the base plate.

5. The combustor assembly of claim 1, wherein the liner is an outer liner.

6. The combustor assembly of claim 1, wherein the liner is an inner liner, and wherein first grommet and forward end of the inner liner may move relative to the second grommet and the second end of the heat shield.

7. The combustor assembly of claim 1, wherein the liner and the heat shield are each comprised of a ceramic matrix composite material, and wherein the annular dome is comprised of a metal material.

8. A gas turbine engine defining an axial direction, the gas turbine engine comprising:
a compressor section;
a turbine section mechanically coupled to the compressor section through a shaft; and
a combustor assembly disposed between the compressor section and the turbine section, the combustor assembly including
an annular dome including an enclosed surface defining a slot, an inner dome and an outer dome;
a liner at least partially defining a combustion chamber and extending between an aft end and a forward end generally along the axial direction, the forward end of the liner received within the slot of the annular dome;
a heat shield including a first end and a second end, at least one of the first end and the second end also received within the slot of the annular dome; and
a mounting assembly positioned at least partially within the slot of the annular dome and attaching the forward end of the liner and the end of the heat shield to the annular dome
wherein said heat shield extends from said inner dome to said outer dome,
wherein said heat shield is attached to both of said inner dome and said outer dome,
wherein the mounting assembly includes a pin, a first grommet, and a second grommet, wherein the first grommet is positioned in an opening in the forward end of the liner, wherein the second grommet is positioned in an opening in the heat shield, and
wherein the first and second grommets are positioned around the pin.

9. The gas turbine engine of claim 8, wherein the annular dome includes a base plate and a yoke, wherein the base plate and the yoke extend substantially parallel to one another, and wherein the enclosed surface of the dome includes a surface of the base plate and a surface of the yoke such that the slot is defined between the base plate and the yoke.

10. The gas turbine engine of claim 9, wherein the mounting assembly extends through the yoke of the annular dome, the forward end of the liner, the end of the heat shield, and the base plate of the annular dome.

11. The gas turbine engine of claim 10, wherein the mounting assembly includes a bushing, wherein the pin extends through the yoke, the forward end of the liner, one of the first end and the second end of the heat shield, and the base plate, and
wherein the bushing is positioned around the pin within the slot and pressed between the yoke and the base plate.

12. The gas turbine engine of claim 8, wherein the liner is an outer liner.

13. A combustor assembly for a gas turbine engine defining an axial direction, the combustor assembly comprising:
an outer annular dome including an enclosed surface defining a slot;
an outer liner including a forward end received within the slot of the outer annular dome;
an inner annular dome also including an enclosed surface defining a slot;
an inner liner including a forward end received within the slot of the inner annular dome, the inner and outer liners at least partially defining a combustion chamber; and
a heat shield including a first end and a second end, the first end co-mounted with the outer liner to the outer annular dome within the slot of the outer annular dome, and the second end co-mounted with the inner liner to the inner annular dome within the slot of the inner annular dome,
wherein said heat shield extends from said inner annular dome to said outer annular dome,
wherein an inner mounting assembly is positioned at least partially within the slot of the inner annular dome, the inner mounting assembly includes a pin, a first grommet, and a second grommet, wherein the first grommet is positioned in an opening in the forward end of the inner liner, wherein the second grommet is positioned in an opening in the second end of the heat shield, wherein the first and second grommets are positioned around the pin, and
wherein an outer mounting assembly includes a single grommet comprising an outer collar positioned adjacent to an outside surface of the outer liner, a middle collar positioned adjacent to an inside surface of the outer liner and an outside surface of the heat shield, and an inner collar positioned adjacent to an inside surface of the heat shield.

14. The combustor assembly of claim 13, further comprising:
wherein at least a portion of the outer mounting assembly is positioned within the slot of the outer annular dome, co-mounting the forward end of the outer liner and the first end of the heat shield to the outer annular dome; and
wherein at least a portion of the inner mounting assembly is positioned within the slot of the inner annular dome, co-mounting the forward end of the inner liner and the second end of the heat shield to the inner annular dome, wherein said inner mounting assembly is configured to allow for a relative thermal expansion of the inner liner.

\* \* \* \* \*